United States Patent [19]

Urata et al.

[11] Patent Number: 4,696,562

[45] Date of Patent: Sep. 29, 1987

[54] MULTIFUNCTIONAL COPYING MACHINE

[75] Inventors: Yoshihito Urata, Katano; Masaichiro Tatekawa, Sakai; Toshiharu Sasaki, Kawanishi, all of Japan

[73] Assignee: Matsushita Electric Industrial Co., Ltd., Kadoma, Japan

[21] Appl. No.: 746,112

[22] Filed: Jun. 18, 1985

[30] Foreign Application Priority Data

Jun. 18, 1984 [JP] Japan .................................. 59-125645
Jun. 18, 1984 [JP] Japan .................................. 59-125647

[51] Int. Cl.⁴ ............................................ G03G 15/00
[52] U.S. Cl. ........................................ 355/3 R; 355/8
[58] Field of Search ........................... 355/3 R, 7, 8, 11

[56] References Cited

U.S. PATENT DOCUMENTS 4,297,713 10/1981 Ichikawa et al. ................ 355/3 R X
4,379,631 4/1983 Kitamura et al. ............... 355/3 R X
4,397,537 8/1983 Tamura ................................ 355/3 R Primary Examiner—Arthur T. Grimley
Assistant Examiner—J. Pendegrass
Attorney, Agent, or Firm—Wenderoth, Lind & Ponack

[57] ABSTRACT

A multifunctional copying machine which has a copier function and/or a laser printer function has a copying unit for forming on the surface of a photosensitive body an electrostatic latent image corresponding to an image on a document placed on a document table, developing the latent image, and transferring the developed image onto a transfer sheet, and further has a laser scanning unit for producing a laser beam for scanning the surface of the photosensitive body. The laser scanning unit is detachably attached to the exterior of the copying unit, and the laser beam is guided through a space below the document table.

6 Claims, 10 Drawing Figures

MULTIFUNCTIONAL COPYING MACHINE

BACKGROUND OF THE INVENTION

1. Field of the Invention:

The present invention relates to an electrophotographic copying machine in which an electrostatic latent image is formed on a photosensitive body, the electrostatic latent image is developed with a toner or the like, and the developed image is transferred to a recording sheet, and more particularly to a multifunctional copying machine capable of producing an optional picture by means of a laser beam employed as an exposure means.

2. Description of the Prior Art:

Recently, reduction in size and in cost of copying machines has been promoted. On the other hand, the progress of laser beam control techniques has accelerated the reduction in size of the so-called laser printers of the electrophotographic system employing a laser beam as an exposure means.

A copying machine and a laser printer both use the same in electrophotographic processes. They differ in that the copying machine irradiates an original image with an exposure lamp and focuses the original image on a photosensitive body for exposure by means of a lens, whereas the laser printer scans the surface of a photosensitive body with a laser beam for exposure and forms an optional electrical latent image on the surface of the photosensitive body through the on-off control of the laser beam.

Notwithstanding such common features, the copying machine and the laser printer are designed and manufactured individually, and hence users are required to have both a copying machine and a separate laser printer. Accordingly, a multifunctional copying machine having both the functions of the copying machine and those of the laser printer has been desired.

Accordingly, the present invention has been made to provide a compact multifunctional copying machine employing advanced laser control techniques.

SUMMARY OF THE INVENTION

It is an object of the present invention to provide a multifunctional copying machine based on a compact copying machine, effectively provided with an additional laser exposure means, and having both the functions of a copying machine and those of a laser printer.

The multifunctional copying machine of the present invention comprises: an electrophotographic copying unit for forming an electrostatic latent image corresponding to an original image on a photosensitive body, developing the electrostatic latent image with a toner and transferring the developed image onto a transfer sheet; and a laser scanning means for scanning the surface of the photosensitive body with a laser beam, attached additionally to the exterior of the copying unit. Thus a compact multifunctional copying machine capable of reproducing an original image and producing an optional image by means of the laser beam is provided. Furthermore, according to the present invention, the laser scanning means is constructed in a unit, the laser scanning unit is detachably attached to the copying machine and the laser beam emitted by the laser scanning means is guided to the surface of the photosensitive body below a document table of the copying unit, so that an ordinary copying machine can readily be modified into a multifunctional copying machine capable of laser exposure.

DESCRIPTION OF THE PREFERRED EMBODIMENT

A preferred embodiment of the present invention will be described hereinafter in conjunction with the accompanying drawings.

Figure 1:
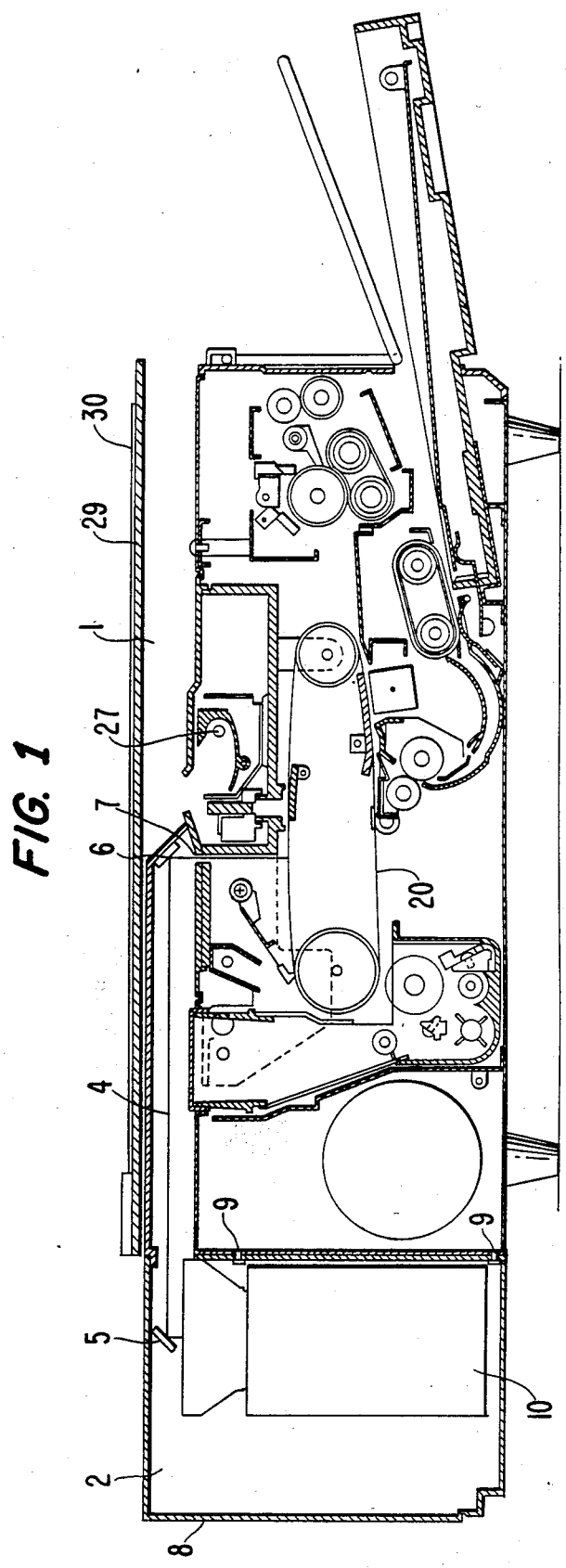
FIG. 1 is a sectional side elevation of a multifunctional copying machine, in a preferred embodiment, according to the present invention.
Figure 2:
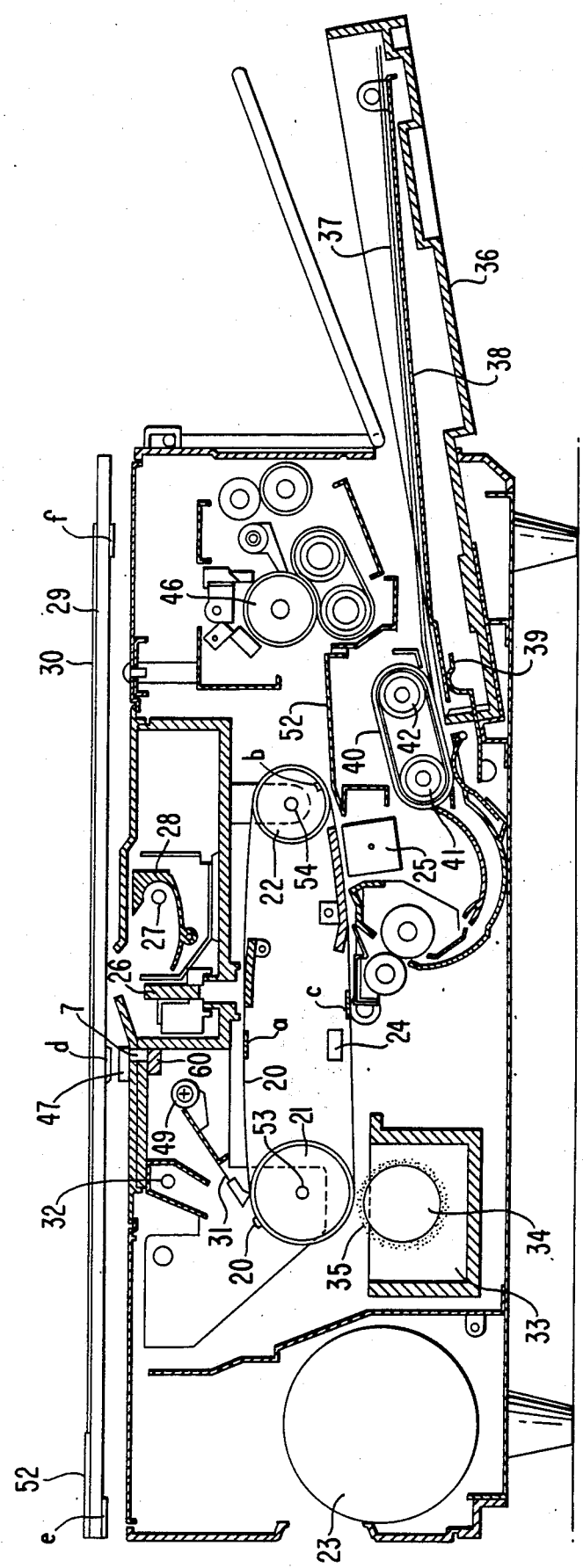
FIG. 2 is a sectional side elevation of the copying unit, namely, the main unit, of the multifunctional copying machine of FIG. 1.

Referring to FIG. 1, indicated at 1 is a copying unit shown in FIG. 2 and at 2 is a laser scanning unit combined with the copying unit 1. Indicated at 10 is a laser scanning means which generates a laser beam, and at 5 and 6 are reflecting mirrors for guiding the laser beam through a laser beam passage 7 to a photosensitive body 20 included in the copying unit.

Indicated at 8 is an outer case of the laser scanning unit 2. The reflecting mirror 6 is attached to the outer case 8. The outer case 8 can be detachably attached to the copying unit 1 with screws 9. Naturally, the reflecting mirror 6 need not necessarily be included in the laser scanning unit 2, but may be provided separately from the laser scanning unit.

Thus, the multifunctional copying machine can readily be constituted simply by attaching the laser scanning unit 2 to the copying unit 1, namely, the copying machine, shown in FIG. 2. The copying unit 1 is constituted, as shown in FIGS. 1 and 2, so as to feed a transfer sheet from one side thereof and to deliver the transfer sheet from the same side. This arrangement of the copying unit 1 facilitates attaching the laser scanning means to the other side of the copying unit 1, namely, the side opposite to the transfer sheet feeding and delivering side.

The manner of operation of the copying unit 1 will be explained with reference to FIGS. 2, 3, 4, 5 and 6.

In FIG. 2, there are shown a photosensitive belt 20, a joint 20' of the opposite ends of the photosensitive belt 20 for forming the photosensitive belt 20 in an endless form, first and second rollers 21 and 22 around which the photosensitive belt 20 runs, a motor 23, a position sensor 24 for detecting the rotational position of the photosensitive belt 20 by the detection or marks a, b and c provided on the photosensitive belt 20, a corotron 25, an optical fiber lens array 26, an exposure lamp 27, a reflecting plate 28 for focusing the image of a document 30 placed on a document table 29 on the photosensitive belt 20, a cleaning blade 31 for scraping off residual toner from the photosensitive belt 20, a static electricity eliminating lamp 32, a developing unit 33 which carries toner 35 to the surface of the photosensitive belt 20 by means of a magnet roller 34 to develop a latent image formed on the surface of the photosensitive belt 20, a sheet feeding cassette 36, transfer sheets 37 mounted on a sheet feeding plate 38 and pressed against a sheet feeding belt 40 with a pressure plate 39, timing rollers 44 and 45, a fixing unit 46, and a document table position sensor 47 capable of detecting marks d, e and f provided on the document table 29.

The manner of operation of the copying unit of the above-mentioned construction will be explained hereinafter.

(1) Sheet feeding operation:

A series of copying operations is started from the state as shown in FIG. 2. The motor is actuated to drive the photosensitive belt in the direction indicated by the arrow in FIG. 3. Simultaneously, the document table 29 is moved in the direction indicated by the arrow and is stopped upon the detection of the mark e by the document table position sensor 47. The sheet feeding belt 40 is turned in the direction indicated by the arrow to feed a transfer sheet 37 into a sheet feeding passage 43. The operation of the sheet feeding belt 40 is stopped to complete the sheet feeding operation upon the arrival of the leading edge of the transfer sheet 37' at the timing rollers 44 and 45 as shown in FIG. 3.

Figure 3:
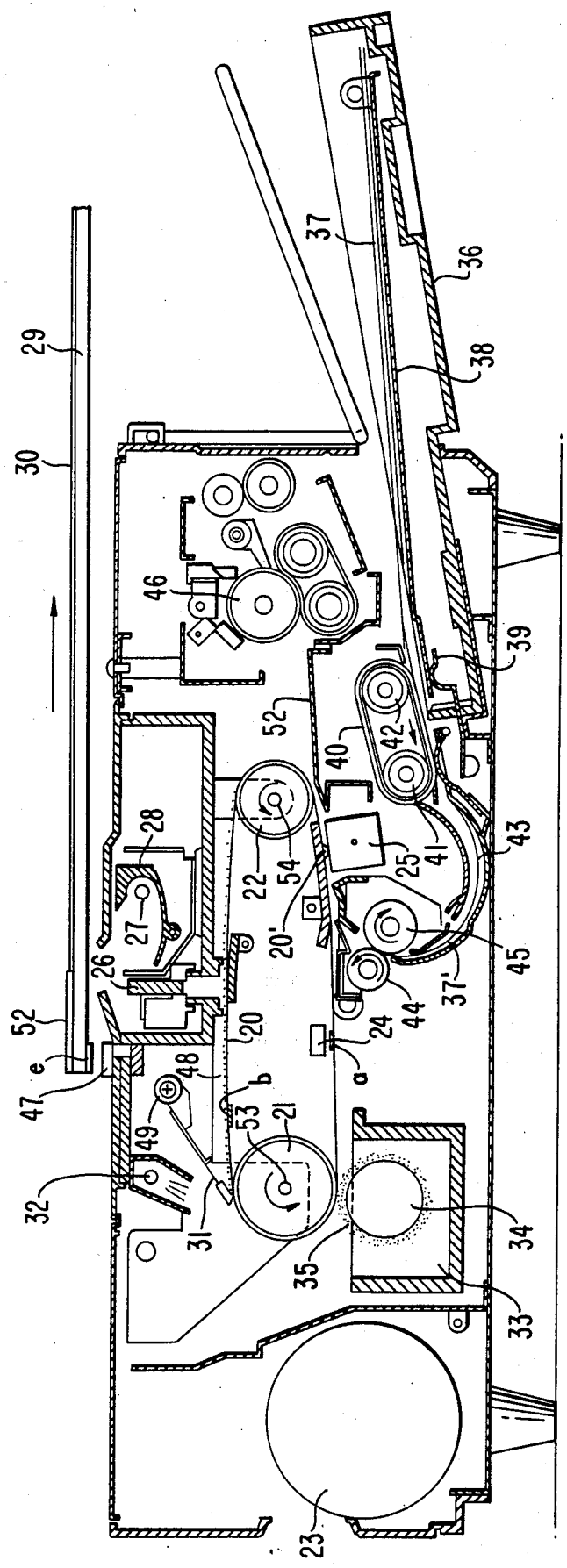
FIGS. 3, 4, 5 and 6 are sectional side elevations of the copying unit of the multifunctional copying machine of FIG. 1, for assistance in explaining the operation of the same.

(2) Charging operation:

As shown in FIG. 3, as soon as the photosensitive belt position sensor 24 detects the mark a provided on the backside of the photosensitive belt 20 while the photosensitive belt 20 is turned, the corotron 25 is actuated to charge the photosensitive belt 20. The residual toner 48 has been scraped off the surface of the photosensitive belt 20 by the cleaning blade 31 and the residual charge has been eliminated by illuminating the surface of the photosensitive belt 20 with the static electricity eliminating lamp 32 before the start of the charging operation as shown in FIG. 3. The surface of the photosensitive belt 20 is kept clean even after the surface has passed through the developing unit 33.

(3) Exposure operation:

The photosensitive belt 20 is turned further from the charging starting position shown in FIG. 3. When the joint 20' passes below the optical fiber lens array 26, namely, when the photosensitive belt position sensor 24 detects the mark b, the exposure lamp 27 is turned on and the document table 29 is started to move leftward at the same speed as that of the photosensitive belt 20. Thus the image of the document 30 is projected on the surface of the photosensitive belt 20 to produce an electrostatic latent image corresponding to the image of the document.

Figure 4:
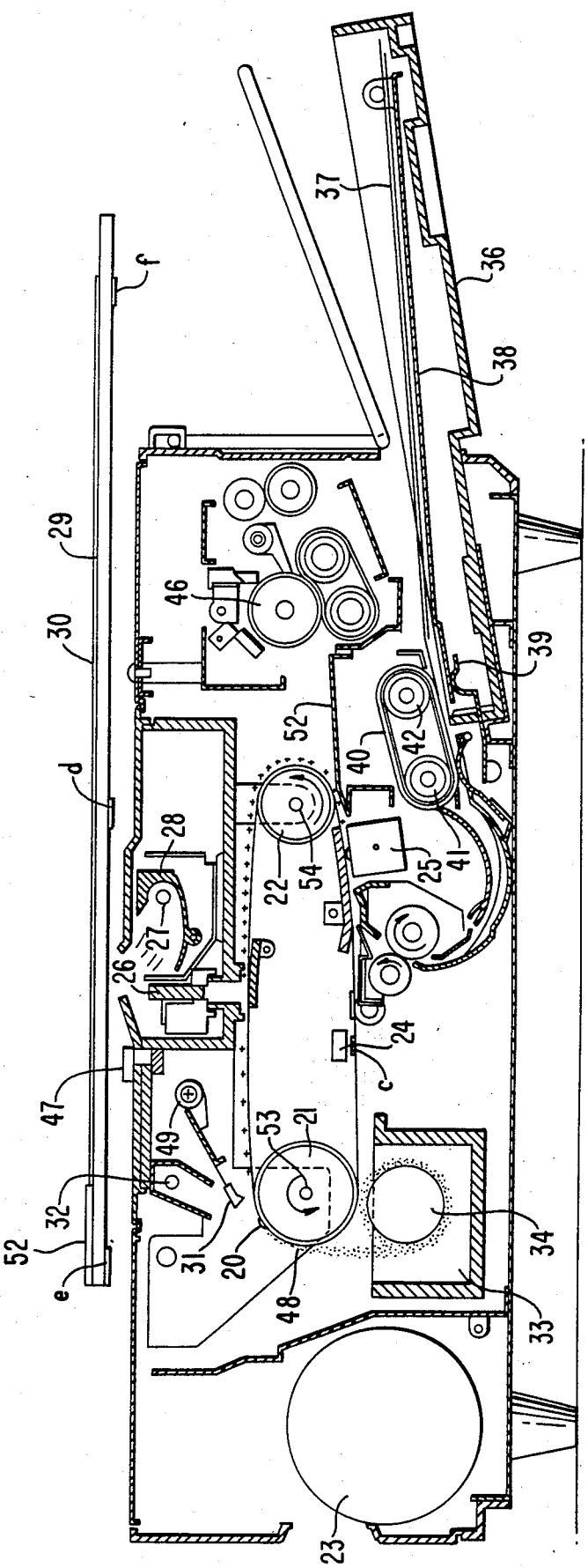

As shown in FIG. 4, when the joint 20' of the photosensitive belt 20 arrives practically at a position opposite to the cleaning blade 31, namely, when the photosensitive belt position sensor 24 detects the mark c, the cleaning blade 31 is turned on a shaft 49 so as to be retracted from the surface of the photosensitive belt 20. Then, the residual toner 48' scraped off the surface of the photosensitive belt 20 and accumulated on the belt surface travels together with the photosensitive belt, falls into a toner container 33 of the developing unit is mixed with the toner contained in the toner container, and is used again for developing an electrostatic latent image.

Simultaneously with the retraction of the cleaning blade 31 from the surface of the photosensitive belt 20, the static electricity eliminating lamp 32 is turned off so that the cleaning blade and the static electricity eliminating light will not affect adversely the electrostatic latent image 50 formed on the surface of the photosensitive belt 20. During the charging operation and the exposure operation, the photosensitive belt 20 is turned through one full rotation from the state shown in FIG. 2.

Figure 5:
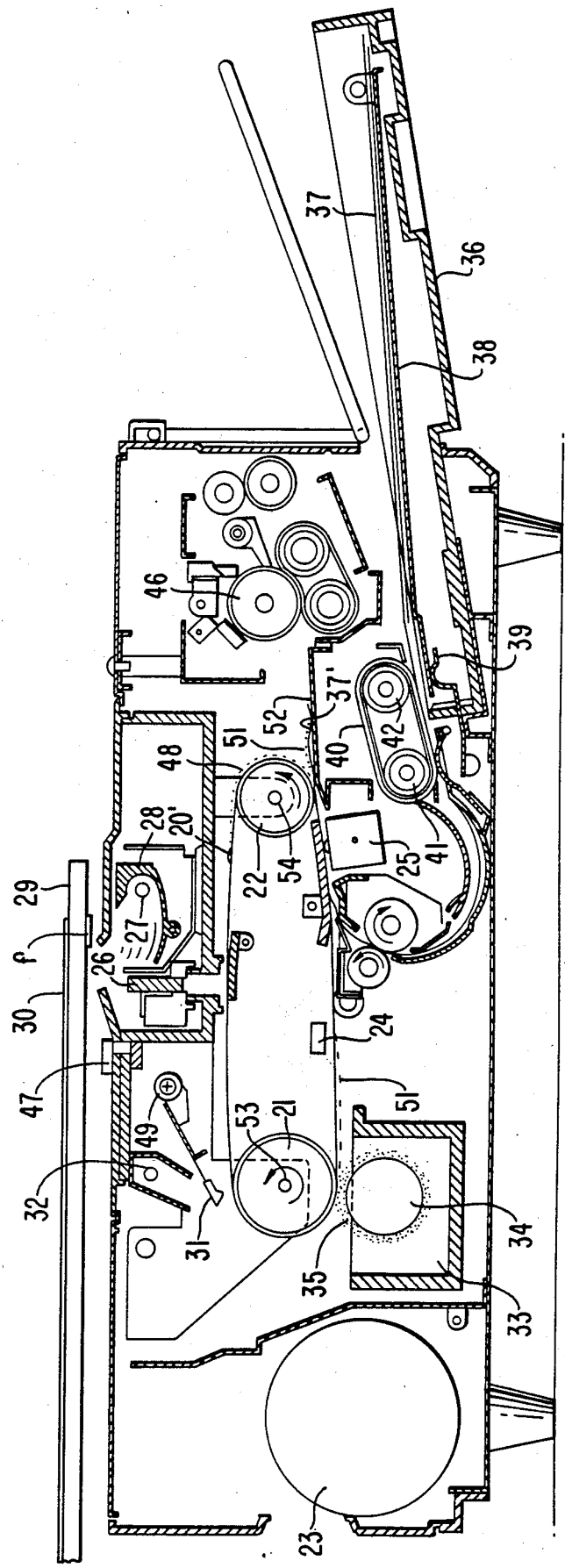

(4) Developing and transferring operations:

As shown in FIG. 5, as the photosensitive belt 20 is turned further, the electrostatic latent image 50 formed on the surface of the photosensitive belt 20 is developed as it passes through the developing unit 33 and a toner image 51 corresponding to the electrostatic latent image 50 is developed on the photosensitive belt 20.

When the joint 20' of the photosensitive belt 20 passes above the corotron 25, namely, when the photosensitive belt position sensor 24 detects the mark a, the timing rollers 44 and 45 are actuated to feed the transfer sheet 37' into the transfer passage. Consequently, the transfer sheet 37' is charged from the backside thereof by the corotron 25 and the toner image 51 carried on the photosensitive belt 20 is transferred to the surface of the transfer sheet 37'. Generally, the operating conditions of the corotron 25 for charging are different from those for transferring. Accordingly, it is possible to convert the operating conditions of the corotron 25 from the charging conditions into the transferring conditions upon the detection of the mark a by the photosensitive belt position sensor 24. The front end of the toner image 51 can correctly be aligned with the front end of the transfer sheet 37' by adjusting the position of a document positioning plate 52 on the document table 29.

(5) Stripping operation:

Since the transfer sheet is charged intensively from the backside thereof by the corotron 25 for transferring operation, the transfer sheet is caused to adhere closely and firmly to the photosensitive belt 20. Accordingly, in a conventional copying machine, the transfer sheet is separated forcibly mechanially by a suitable means, such as stripping fingers, or electrically by eliminating the charge with an AC corotron. According to the present invention, the photosensitive belt 20 turns round the second roller 22 immediately after passing through the transfer unit, and since the outside diameter of the second roller 22 is substantially smaller than that of a conventional photosensitive drum, the transfer sheet 37' separates itself from the photosensitive belt 20 due to its own resilience against the electrostatic attraction of the photosensitive belt, as the photosensitive belt 20 moves along the circumference of the second roller 22, and then the transfer sheet 37' is guided by a sheet guide 52 toward the fixing unit 46.

As the photosensitive belt turns further from the state shown in FIG. 5, the joint 20' of the photosensitive belt 20 arrives again at the position directly below the optical fiber lens array 26, where the exposure process for the document 30 is completed. Then, the document table is stopped upon the detection of the mark f by the document table position sensor 47, and then the document table starts returning to the original position. The document table is stopped upon the detection of the mark d by the document table position sensor 47.

Figure 6:
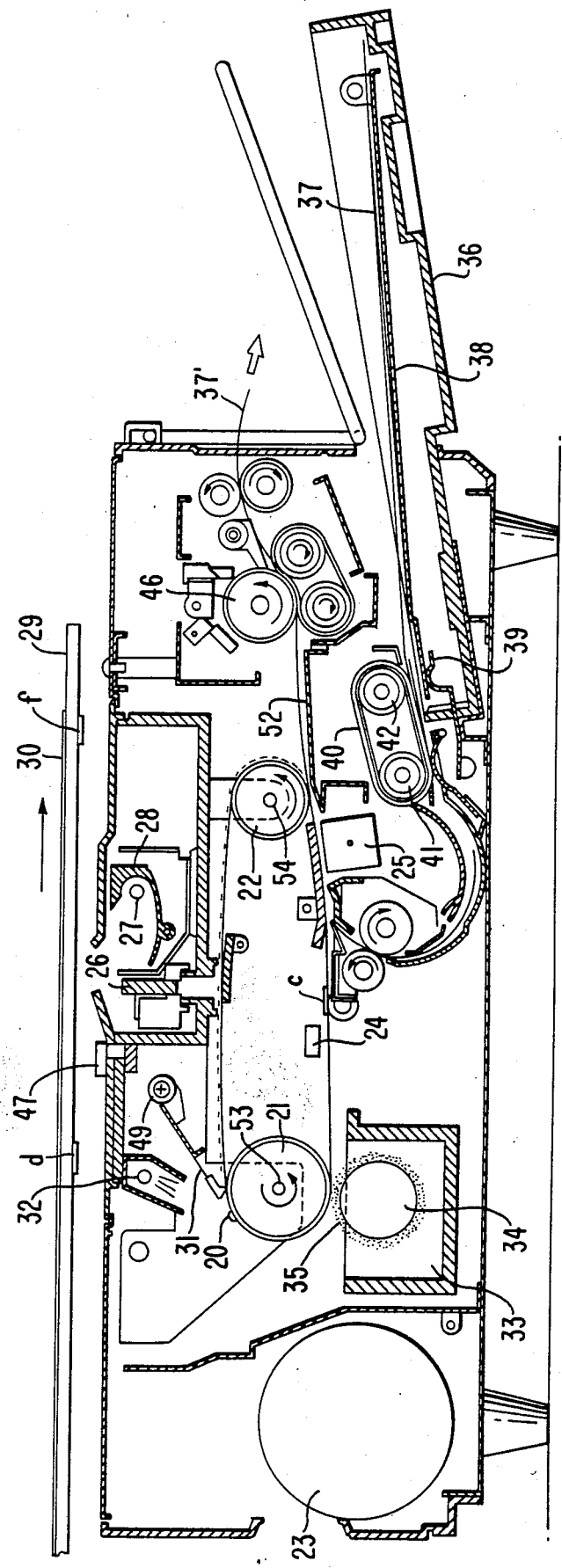

(6) Cleaning operation:

As shown in FIG. 5, the residual toner 48, namely, the toner which has not been applied to the transfer sheet, remains on the surface of the photosensitive belt 20. The residual toner 48 needs to be removed and the surface of the photosensitive belt 20 must be cleaned before the photosensitive belt 20 undergoes the next exposure operation. Accordingly, upon the detection of the mark c by the photosensitive belt position sensor 24 as shown in FIG. 6 while the photosensitive belt 20 is moved further from the state of FIG. 5, the cleaning blade 31 is pressed against the surface of the photosensitive belt 20 to scrape off the residual toner 48 from the surface of the photosensitive belt 20. Simultaneously, the static electricity eliminating lamp 32 is turned on to irradiate the surface of the photosensitive belt 20 in order to eliminate the residual charge of the photosensitive belt and to make the photosensitive belt 20 ready for the next charging process. At this moment, the photosensitive belt 20 has been rotated twice from the initial position.

The photosensitive belt 20 is moved further, and when the joint 20' passes above the corotron 25 again, the application of a voltage to the corotron 25 is interrupted to prevent unnecessary charging of the photosensitive belt 20.

The photosensitive belt 20 is moved still further, and when the joint 20' approaches the cleaning blade 31, namely, after the photosensitive belt 20 has been turned three rotations, the cleaning operation is completed and the motor 23 is stopped to complete one copying operation cycle. Thus, the photosensitive belt 20 turns three turns in one copying operation cycle. Before the copying operation is completed, the transfer sheet 37' undergoes a transferrring process and a fixing process and is delivered outside the copying unit. The document table 29 has been returned to the original position shown in FIG. 2 before the completion of the entire copying operation.

One copy of a document is produced in one cycle of the above-mentioned operations. In order to produce a plurality of copies of a single document, a plurality of the copying cycles are carried out successively by starting the next charging operation without interrupting the application of the voltage to the corotron 25 after the completion of the transferring operation, and the document table 29 is moved repeatedly to the exposure starting position. In such a case, the photosensitive belt 20 is turned two turns in a single copying cycle, and hence a copying mode in which a plurality of the copying cycles are carried out successively is more efficient than a copying mode in which only a single copying cycle is carried out.

The application of the present invention is not limited to the constitution of the above-mentioned embodiment, but the present invention is applicable similarly to a copying unit employing a photosensitive drum instead of the photosensitive belt.

The manner of copying operation of the copying unit 1 has been described hereinbefore. The combination of the copying unit 1 and the laser scanning unit 2 of the present invention, for exposing the phtosensitive belt 20 to a laser beam transmitted below the document table 29 to the photosensitive belt 20, will be described hereinafter. In joining the laser scanning unit 2 to the copying unit 1, a shading piece 60 detachably provided on the copying unit 1 is removed to open the laser passage 7 for receiving a laser beam 4 therethrough.

Figure 7:
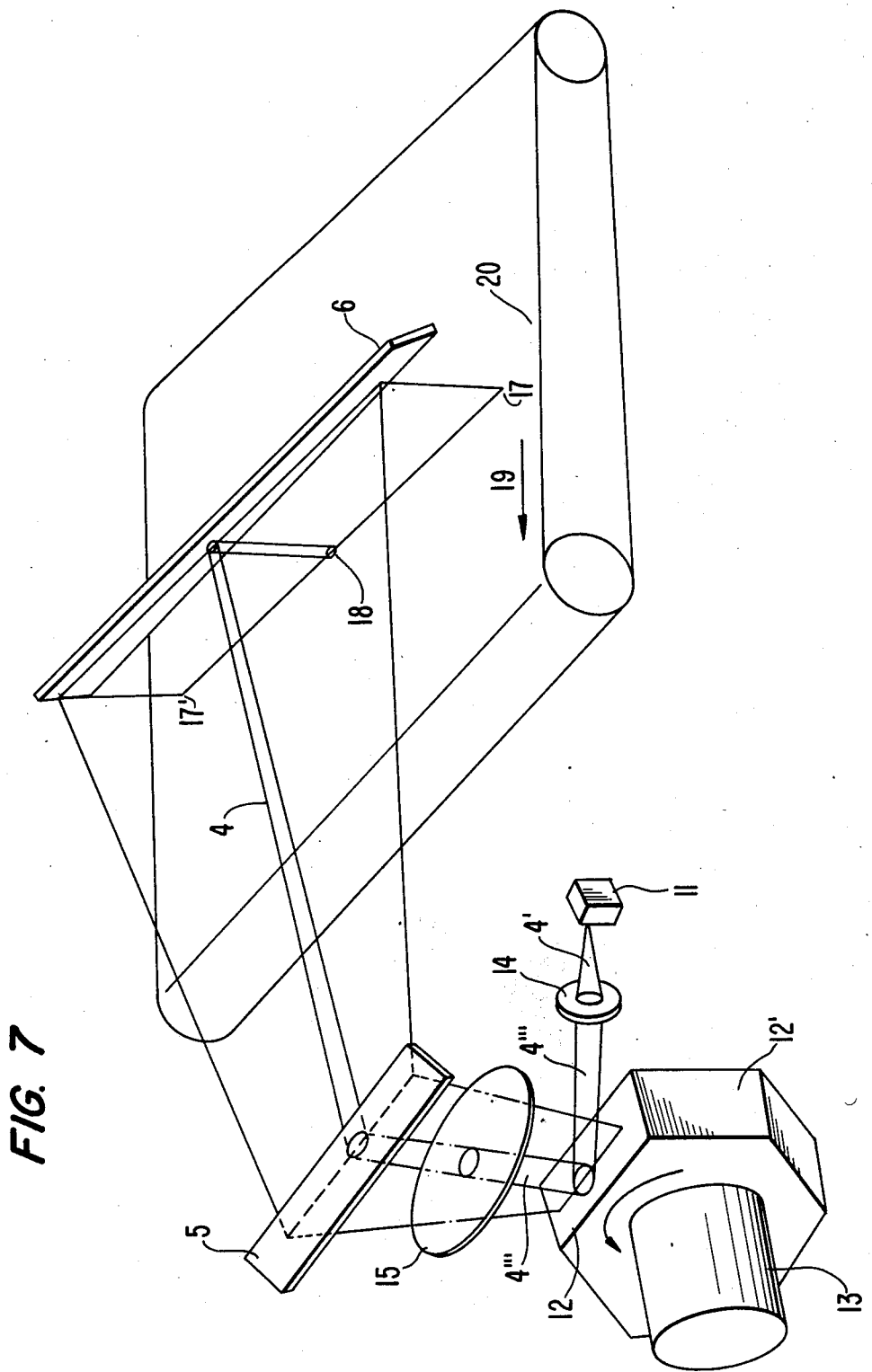
FIG. 7 is a schematic view showing a laser optical system.

FIG. 7 is a perspective view of an optional system for laser scanning. In FIG. 7, there are shown a collimating lens 14 for collimating the laser rays 4' emitted by a semiconductor laser 11 into a laser beam 4'', a polyhedral mirror 12, a motor 13 for rotating the polyhedral mirror 12 at a high speed to reflect the laser beam 4'' at an angle of reflection corresponding to the rotational position of the polyhedral mirror 12, a focusing lens 15 for focusing the laser beam 4'' reflected by the polyhedral mirror 12 on the photosensitive belt 20 in a minute spot 18, and reflecting mirrors 5 and 6 for guiding the laser beam 4 to the surface of the photosensitive belt 20 of the copying unit.

When the polyhedral mirror 12 is rotated, the direction of reflection of the laser beam varies according to the rotational position of the polyhedral mirror 12 to sweep the surface of the photosensitive belt 20 along the width of the same from a position 17 on one side to a position 17' on the other side of the photosensitive belt 20. As the polyhedral mirror 12 is rotated further, the next reflecting face 12' reflects the laser beam 4'' to sweep the surface of the photosensitive belt 20 again with a laser beam spot 18 from the position 17 to the position 17'. Since the photosensitive belt 20 is moving in the direction of the arrow 19 while the polyhedral mirror 12 is rotated, the entire area of the surface of the photosensitive belt 20 is swept successively with the laser beam spot 18. Naturally, on-off control of the semiconductor laser by predetermined electric signals enables a pattern exposure of the photosensitive belt 20 according to the electric signals.

The laser scanning means indicated at 10 in FIG. 1 comprises at least the components shown in FIG. 7, namely, the semiconductor laser 11, the collimating lens 14, the polyhedral mirror 12 and the focusing lens 15.

If the laser scanning unit is actuated for laser beam exposure of the photosensitive belt 20 simultaneously with the start of the exposure operation of the copying unit, in which the exposure lamp 27 is turned on to form a latent image corresponding to the image of the document 30 on the photosensitive belt 20, the surface of the photosensitive belt 20 is exposed to both the light image corresponding to the image of the document 30 and the laser beam.

Naturally, if the operation of the laser scanning unit is stopped while the copying unit is operated, the photosensitive belt 20 is exposed only to the light image corresponding to the image of the document 30, and hence an ordinary copying operation is carried out.

If the laser scanning unit is operated while the copying unit is operated with the exposure lamp 27 turned off, the photosensitive belt 20 is exposed only to the laser beam, and hence the multifunctional copying machine functions as a laser printer.

Figure 8A:
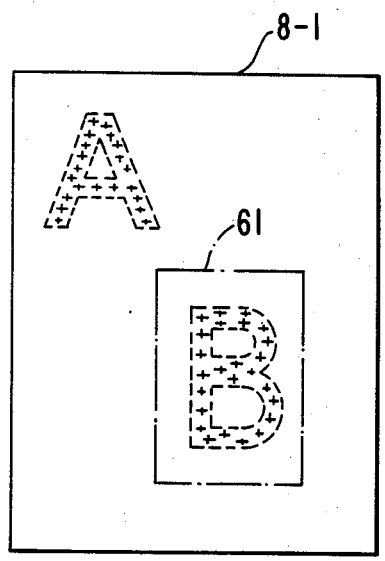
FIGS. 8a and 8b are diagrams for assistance in explaining the trimming function of the laser scanning unit.
Figure 8B:
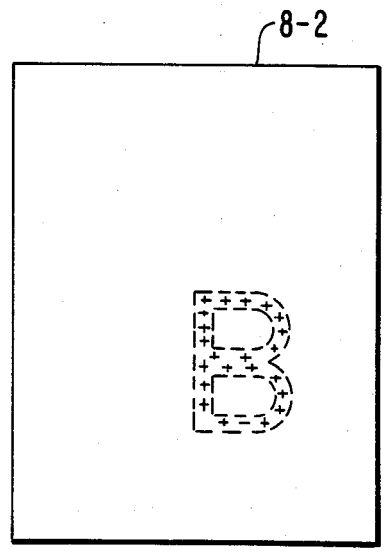
Figure 9:
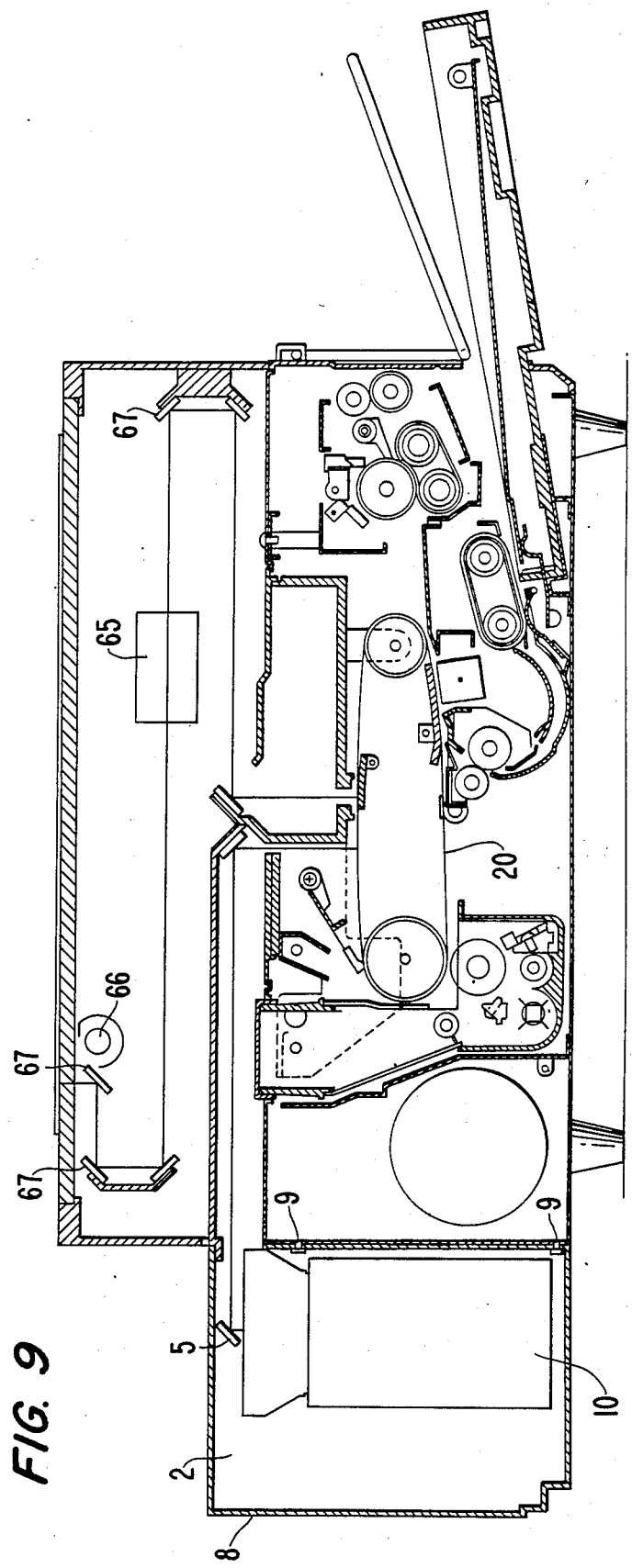
FIG. 9 is a sectional side elevation showing the construction of a multifunctional copying machine of the fixed document table type.

If both the copying unit and the laser scanning unit are operated simultaneously in the normal operating mode, the unnecessary portion of the latent image corresponding to the image of the document 30 can be eliminated as illustrated in FIGS. 8a and 8b.

Suppose that an electrostatic latent image 8-1 formed on the photosensitive belt 20 corresponds to the image of the document 30 and when the emission of the laser beam is interrupted while the laser beam spot sweeps an area enclosed by alternate long and short dash line 61, only the electrostatic latent image in the area enclosed by the line 61 corresponding to a portion of the image of the document 30 remains on the photosensitive belt 20 and the rest of the electrostatic latent image is erased by the laser beam exposure, so that a resultant electrostatic latent image 8-2 shown in FIG. 8b is formed on the photosensitive belt 20. Thus trimming of the image is achieved. The electrostatic latent image 8-2 is developed and transferred to a transfer sheet to complete the copying operation.

The multifunctional copying machine of the present invention comprising the copying unit and the laser scanning unit can readily be converted into just a laser printer simply by removing the document table 29 and the exposure lamp 27 from the copying unit. Thus the present invention enables the use of a single machine in three configurations as a copying machine, a laser printer and a multifunctional copying machine.

Although the present invention has been described with reference to a construction including a movable document table, it is apparent that the present invention can similarly be applied to a construction including a fixed document table.

As apparent from what has been described hereinbefore, the multi-functional copying machine of the present invention comprises an ordinary copying machine as a copying unit and a separate laser scanning means attached to the copying unit, so that it is possible to convert an ordinary copying machine readily into a multi-functional copying machine having a laser exposure function. Accordingly, it is not necessarsy to provide a copying machine and a laser printer individually, which reduces designing work greatly, and it is not necessary to provide a separate a copying machine and a laser printer.

Furthermore, a single multifunctional copying machine is able to function as an ordinary copying machine, a laser printer and a multi-functional copying machine having a trimming function.

Still further, since the laser scanning means is formed in a unit which can be easily detachably mounted on a copying unit, not only the manufacturers, but also the users are able to convert a copying machine readily to a multifunctional copying machine.

What is claimed is:

1. A multifunctional copying machine comprising:
    an electro-photographic copying unit having: a housing; a document table on said housing for supporting thereon a document to be copied; a photosensitive body within said housing; an exposure means within said housing for forming on a surface of said photosensitive body an electrostatic latent image corresponding to an image on the document; developing means within said housing for developing the electrostatic latent image with a toner; and transfer means within said housing for transferring the developed image onto a transfer sheet positioned sequentially around said photosensitive body; said copying unit having an unobstructed space extending along said document table below said document table and having one end opening to the outside of said housing and the other end having an opening between said space and said photosensitive body;
    a laser scanning unit detachably attached to said copying unit on the exterior of said housing for producing a laser beam for scanning said surface of said photosensitive body; and
    guide means for guiding said laser beam from outside said copying unit into said one end of said space and through said space below said document table and through said opening to said photosensitive body.

2. The copying machine according to claim 1, wherein said laser scanning unit comprises a laser for emitting said laser beam, a rotatable polyhedral mirror positioned for reflecting said laser beam, and means for detachably attaching said laser scanning unit to said exterior of said copying unit housing.

3. The copying machine according to claim 1, wherein said guide means comprises a first mirror positioned for reflecting said laser beam from said laser scanning unit and directing the reflected laser beam through said space below said document table, and a second mirror positioned for reflecting the laser beam reflected from said said first mirror and directing the reflected laser beam onto said surface of said photosensitive body.

4. The copying machine according to claim 1, wherein said copying unit further comprises a transfer sheet feeding means for feeding the transfer sheet to said transfer means and transfer sheet delivering means for delivering the transfer sheet from said transfer means, both said transfer sheet feeding means and said transfer sheet delivering means being on one side of said copying unit, said laser scanning unit being attached to the other side of said copying unit.

5. The copying machine according to claim 1, further comprising means for interrupting the laser beam producing operation of said laser scanning unit, and means for interrupting the latent image forming operation of said exposure means, whereby the document copying operation and the laser beam scanning operation can be carried out independently of each other.

6. The copying machine according to claim 1, further comprising means for interrupting the laser beam producing operation of said laser scanning unit for leaving only a selected part of said electrostatic latent image corresponding to said image on said document formed on said surface of said photosensitive body.

* * * * *